United States Patent [19]
North

[11] Patent Number: 6,117,493
[45] Date of Patent: Sep. 12, 2000

[54] BEARING WITH IMPROVED WEAR RESISTANCE AND METHOD FOR MAKING SAME

[75] Inventor: Robert B. North, Houston, Tex.

[73] Assignee: Northmonte Partners, L.P., Houston, Tex.

[21] Appl. No.: 09/089,998

[22] Filed: Jun. 3, 1998

[51] Int. Cl.[7] .............................. B05D 1/36; B05D 1/08; B05D 3/02; B23K 9/04

[52] U.S. Cl. ...................... 427/419.7; 427/450; 427/451; 427/576; 427/577; 427/383.7; 427/405; 219/76.1; 219/76.12; 219/76.16; 219/121.47

[58] Field of Search .............................. 427/383.7, 419.7, 427/405, 450, 451, 576, 577; 219/76.12, 76.16, 76.1, 121.47

[56] References Cited

U.S. PATENT DOCUMENTS

| | | |
|---|---|---|
| 3,647,401 | 3/1972 | Meadows . |
| 3,879,094 | 4/1975 | Tschirky et al. . |
| 3,936,295 | 2/1976 | Cromwell et al. . |
| 4,029,368 | 6/1977 | Tschirky et al. . |
| 4,053,306 | 10/1977 | Rodriguez .............................. 75/123 J |
| 4,173,457 | 11/1979 | Smith . |
| 4,277,108 | 7/1981 | Wallace ................................... 308/4 A |
| 4,329,129 | 5/1982 | Ishizuka et al. . |
| 4,618,269 | 10/1986 | Badrak et al. ............................ 384/95 |
| 4,720,199 | 1/1988 | Geczy et al. . |
| 4,732,491 | 3/1988 | Geczy . |
| 4,923,512 | 5/1990 | Timm et al. . |
| 5,038,640 | 8/1991 | Sullivan et al. ........................ 76/108.2 |
| 5,338,506 | 8/1994 | Friederichs et al. . |
| 5,346,316 | 9/1994 | Okada et al. . |
| 5,447,549 | 9/1995 | Yoshimura . |
| 5,492,186 | 2/1996 | Overstreet et al. . |
| 5,498,142 | 3/1996 | Mills . |

*Primary Examiner*—Shrive Beck
*Assistant Examiner*—Michael Barr
*Attorney, Agent, or Firm*—Frank S. Vaden, III; Felsman, Bradley, Vaden, Gunter & Dillon, LLP

[57] ABSTRACT

A steel bearing member having an erosion resistant surface and a method of making the same is disclosed. The steel bearing member comprising a bearing substrate, a first overlay of hardbanding material having sintered cemented metal carbide pellets in steel and containing hard submicron sized particles, and a second overlay of steel containing hard particles that migrated from the first overlay of hardbanding material during application of the second overlay over the first overlay. A radial bearing member and a method of making the same is disclosed. A composition applied to the bearing substrate to improve the erosion resistance of this surface comprising a steel carrier and carbide pellets composed of submicron hard particles cemented with a metal binder is disclosed.

15 Claims, 5 Drawing Sheets

BEARING WITH IMPROVED WEAR RESISTANCE AND METHOD FOR MAKING SAME

BACKGROUND OF THE INVENTION

1. Field of the Invention

This invention relates to improving the wear resistant properties of metal parts and in particular, the erosion resistance of those parts due to sand rock and other debris entrained in fluids passing across the surfaces of those parts. This invention has particular application to improving the surface properties of bearings and rotors such as are used in down hole motors or alternatively in turbines.

2. Description of Related Art

The application of hard metal particles to the surfaces of metal parts is a well known method for improving the wear resistance of such parts. U.S. Pat. No. 3,936,295 issued to Cromwell et al. and entitled "Bearing Members Having Coated Wear Surfaces" discloses bearing members having a coated wear surface applied by plasma-spraying an aggregate of particles onto the surface of the bearing members. More specifically, Cromwell et al. discloses that these particles consist of an aggregate of nickel-aluminum, nickel-molybdenum, tungsten carbide and an intermetallic alloy which are alloyed together during plasma spraying onto the wear surface. The wear surfaces that were coated in Cromwell et al. were the surfaces of a piston in an internal combustion engine. The wear resistant surface achieved through this particular combination of particles was intended to maintain the bearing seal between the piston and cylinder wall without inducing wear through abrasion of the cylinder wall and without sacrificing mechanical strength.

The particles in Cromwell et al. were applied using conventional flame-spray techniques using a plasma arc gun. Much of the art concerning the application of hard metal particles to substrates relies on the use of plasma arc processes and an outline of such procedures is believed to be appropriate. Cromwell et al. describes that "The plasma flame of such a gun (plasma arc) produces temperatures of approximately 32,000 degrees Fahrenheit achieved by applying electrical energy to a gas mixture (such as, for example, a ten to one nitrogen to hydrogen mixture) which causes the gas molecules of the mixture to dissociate into an atomic state. The gases are then ionized, producing electrons and charged ions. The electrical energy absorbed by such ionization is converted to heat energy by de-ionization of the gas. The aggregate is directed into the plasma flame by a carrier gas such as, for example, nitrogen. The particles of the aggregate are propelled by the gas escaping through the nozzle of the gun as a stream of molten particles. The nozzle is aimed at the surface to be coated so that the molten particles impinge thereon. The molten particles solidify to provide a continuous, adherent coating on the surface that results from a combination of mechanical and atomic bonding at the interface of the coating and the substrate body and between the particles themselves to form an alloy of the constituents of the starting aggregate."

U.S. Pat. No. 5,346,316 issued to Okada et al. describes that spray coatings generally contain hard particles such as tungsten and chromium carbides bound with molten metals such as nickel, chromium and cobalt. It is further explained that the surface of an article having such a coating is lower in hardness than the same article made of solid sintered tungsten or chromium carbide. The differences in hardness are reportedly due to defects in the binder metals such as blow holes and/or insufficient binding strength between the hard metal and the binder metal. Okada et al. claims to overcome the deficiencies of spray coating by subjecting the coated article to a heat treatment of 300 to 500 degrees Celsius for a period of not less than one hour. The bearing that is described and claimed in Okada et al. is intended for use in a drainage pump and reportedly exhibits improved wear resistance against water containing earth and sand.

The use of bearings in down hole motors in drilling operations is well known. U.S. Pat. No. 4,329,127 issued to Tschirky et al. and entitled "Sealed Bearing Means For In Hole Motors" generally describes the environment in which these bearings are used. It specifically states that in the drilling of bore holes into or through earth, as in the case of drilling oil and/or gas wells or in certain mining or other earth boring operations, a practice has been to drive the drill bit by a fluid motor installed in a drill pipe string and through which drilling fluid is circulated to drive the fluid motor and then pass through the bit nozzles into the drill hole to flush away cuttings. The drilling fluid and entrained cuttings are then returned to the drilling rig or to the surface through an annulus outside drill string and outside the motor. The drill string applies weight to the bit with the weight of the string being transferred through a bearing assembly which rotatably supports a hollow drive shaft within an elongated housing. The drive shaft is driven by the rotor of the fluid motor, while the bearing housing is fixed to the drill pipe string and remains relatively stationary. The bearing means between the drive shaft and the housing must sustain severe vibration, shock, axial and radial loading.

The bearing assemblies disclosed in the prior art are generally either a sealed assembly in which the drilling mud and entrained debris are prevented from contacting the bearing surfaces or unsealed bearing assemblies wherein the circulating drilling fluids pass directly through the bearing assembly. Tschirky et al. '127 is an example of a sealed bearing assembly in which the bearing elements are protected within a sealed chamber that maintains the bearings in a lubricant fluid. Although the sealed bearing assemblies prevent drilling debris and other corrosive elements in the drilling fluid from contacting and eroding the bearing surfaces, it has been found that there is a tendency for the seals of the bearing chamber to fail in this high pressure and corrosive environment. Further, the use of sealed bearings is accompanied by other problems that interfere with the operation of the hydraulic motor.

U.S. Pat. No. 4,029,368 also issued to Tschirky et al. is an example of an unsealed bearing in which the drilling fluids and entrained debris are at least in part passed directly through the bearing assembly. The passage of the drilling fluids and cutting debris through the bearing assembly can cause a significant amount of abrasion to and erosion of the bearing surfaces in contact with those fluids. The wear resulting from this erosion contributes to the rapid failure of the bearing.

Tschirky et al. '368 discloses a radial bearing made of hard, rigid metal in order to overcome the problems of the rubber radial bearings that had previously been used in the prior art. In particular, Tschirky et al. '368 describes the use of tungsten carbide or some other metal that is harder than the sand and other debris that may be entrained in the drilling fluid. Specifically, this bearing includes a tungsten carbide sleeve that is fixed to the stationary portion of the bearing. The rotating member of the bearing is a steel sleeve that is grooved along its length to receive a plurality of circumabiently spaced tungsten carbide rod inserts. The fluid passageways in the bearing are between the stationary sleeve and the rotating steel sleeve and tungsten carbide rod inserts.

It is explained that the rod inserts were previously made of solid pieces of hard metals that tended to be brittle and break apart or spall when subjected to transverse impacts. Spalling is the failure of a hard brittle material during high point loading in compression. To overcome the brittleness and the potential failure of the inserts, the tungsten rods and sleeve of Tschirky et al. '368 are made by dispersing hard metal particles in a metal matrix powder that is then placed in a mold and heated to a temperature that fuses the metal and bonds the hard particles. The metal matrix produced by this process reportedly overcomes the brittleness problem. However, the disclosure does not address the problem wherein the hard metal particles of the metal matrix cause abrasion to the surfaces of adjacent parts.

U.S. Pat. No. 4,720,199, issued to Geczy et al. and entitled "Bearing Structure For Downhole Motors" is an example of another bearing that is composed of hard metal matrix that is molded into a desired shape. As explained, the bearing assembly of down hole motors will typically have two types of bearing members, one to accommodate radial loads and one to accommodate thrust loads. The radial bearing surface of Geczy et al. '199 comprises a macro crystalline tungsten carbide powder blended together with cemented tungsten carbide cobalt chips. The bearing is made by placing a steel bearing within a cavity, surrounding the steel bearing with the blended mixture and infiltrating the mixture with copper. The copper infiltrant is loaded on top of the blended mixture and infiltrates down into the mixture as the mold cavity is heated.

U.S. Pat. No. 4,732,491, also issued to Geczy et al. and entitled "Downhole Motor Bearing Assembly", describes how the process of Geczy et al. '199 can be used to incorporate the radial and thrust bearing elements of the bearing assembly directly into the drive shaft of the hydraulic downhole motor. Specifically, it is explained that a radial bearing surface may be applied to the cylindrical interior of the stationary housing and the cylindrical exterior surface of the rotating drive shaft, and that mounting sites may be provided on the drive shaft for inserting thrust bearing inserts opposite the thrust inserts on the housing.

U.S. Pat. No, 4,277,108 issued to Wallace and entitled "Hard Surfaced Well Tool And Method Of Making Same" describes a method for placing a wear resistant surface on tool joints in a drilling string. In particular, it cites that previous methods had involved placing a thin layer of hard banding material, namely, tungsten carbide particles, on tool joints. It is also explained how a layer of mild steel on top of the layers of sintered tungsten carbide particles further reduces the wear of the tool joint surfaces and provides abrasive protection to the well casing. According to Wallace, a wear resistant tool joint is preferably made by laying down multiple layers of first larger and then smaller sintered tungsten particles in a steel matrix. Optionally, a layer of mild steel may be laid down over the multiple layers of hard metal particles. However, the disclosure of Wallace is specific to tool joints and it does not suggest or describe a technique for improving the wear resistance of the surfaces of bearings or other metal parts that are exposed to highly erosive environments.

None of the previously discussed prior art methods or devices have a bearing surface that is sufficiently wear resistant for long term use in a highly erosive environment. Attempts have been made to improve wear resistance by increasing the thickness of the hard metal particle layer that is applied by spray coating or molding. However, it has been found that layers of hard metal particles that have a thickness of greater than $3/16$ of an inch will suffer considerable spalling failure. Therefore, there is still a need for a low cost bearing member or other metal parts with hard surfaces that do not easily erode or wear.

It has also been found that although the application of hard metal particles to the surface of one element improves the hardness and wear resistance features of that element, the tendency is for those hard metal particles to act as an abrasive on the surfaces of adjacent elements. As such, the improvements in one part may be at the expense of another. Therefore, there also remains a need for a wear resistant surface and surfacing process which improves wear resistance in the subject part but does not induce wear on adjacent parts.

SUMMARY OF THE INVENTION

Therefore, it is an object of this invention to provide a bearing having a surface structure with improved wear resistant properties such that the bearing surface will not easily erode when subjected to a flow of fluid containing sand and other hard and/or corrosive substances.

It is another object of this invention to provide wear resistant members that may be used in downhole applications, such as the radial and thrust bearings, rotors and drive shafts of hydraulic motors and that such members have an increased life expectancy over known bearings, rotors and drive shafts.

It is yet another object of this invention to provide a steel bearing member having an erosion resistant surface. The bearing may be made from a bearing blank or substrate by applying a first overlay of hardbanding material on the substrate. The first overlay of hardbanding material is composed of cemented metal carbide pellets dispersed in a mild steel. A second overlay of mild steel is applied over the first overlay. During the application of the second overlay a portion of the hard metal particles of the cemented metal carbide pellets in the first overlay are liquified and disperse in the weld puddle that forms the second overlay. This action during the welding process creates a second overlay that contains hard metal particles that have migrated from the first overlay.

It is still another object of this invention to provide a method for making a bearing member having improved wear resistant properties that is both relatively simple and inexpensive to manufacture.

It is a yet another object of this invention to provide a method of making a steel bearing member having an erosion resistant surface. The method including the step of applying to a bearing substrate a first overlay of hardbanding material. The first overlay of hardbanding material has cemented metal carbide pellets dispersed in a mild steel. A second overlay of mild steel is applied to the first overlay using a metal inert gas (MIG) welding process. The MIG welding process causes a portion of the hard metal particles of the cemented metal carbide pellets in the first overlay to liquify into the weld puddle that forms the second overlay thereby creating a second overlay containing hard metal particles derived from the first overlay. The method is concluded by machining the bearing member, either by grinding or other conventional processing, such that the completed bearing has desired dimensions.

DESCRIPTION OF THE PREFERRED EMBODIMENTS

Figure 2:
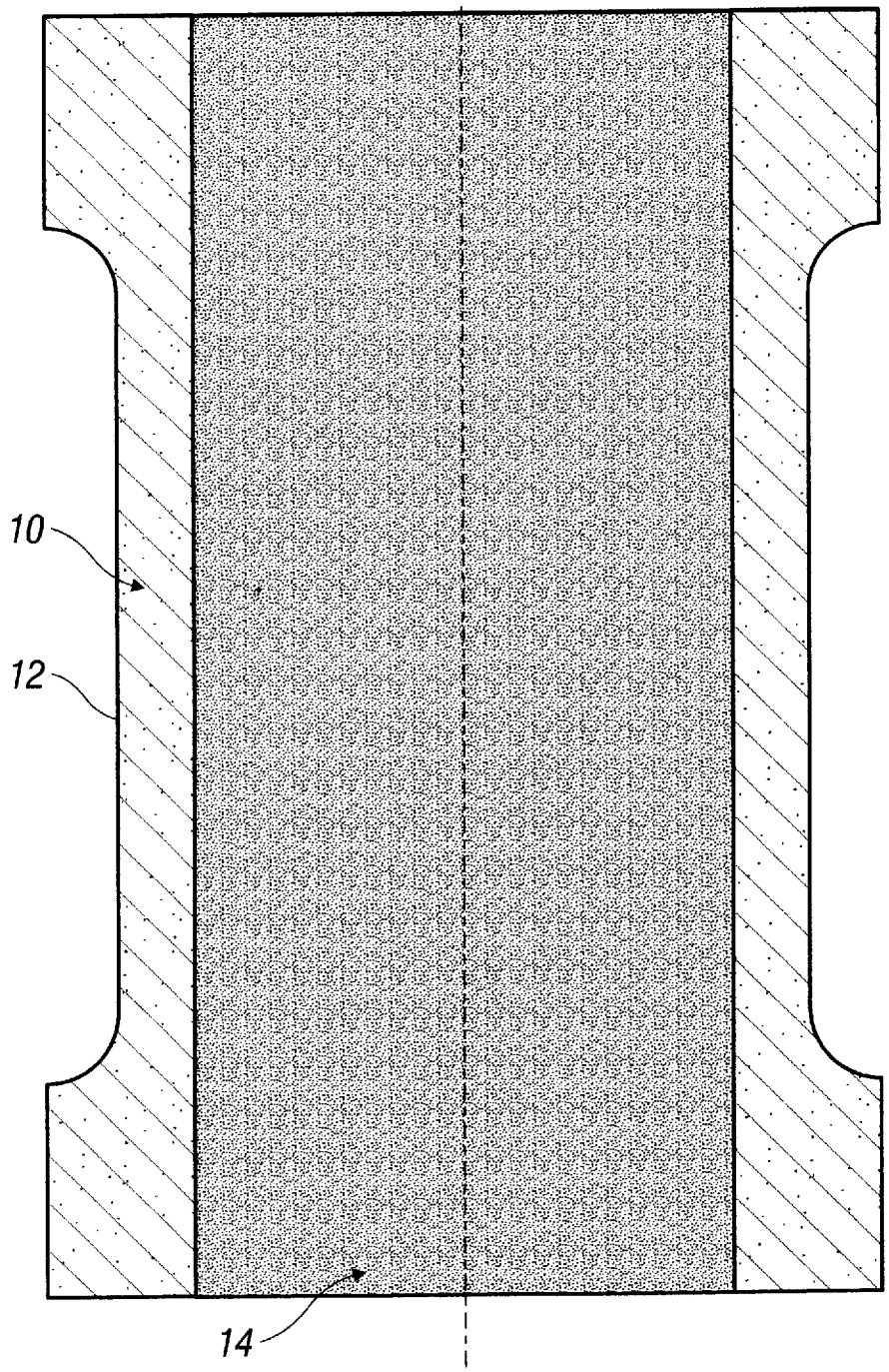
FIG. 2 is a cross sectional view of a male member of a bearing blank prior to applying a wear resistance surface according to the present invention.

Referring to FIG. 2 a typical steel bearing blank 10, with cylindrical internal surfaces 14 is manufactured according to conventional bearing technology. Bearing blank 10 is the male half of a radial bearing assembly. The bearing blank may be made of various steel compositions having various dimensions depending on the bearing's intended use.

Recessed hardbanding groove 12 is formed on the external surface of the bearing blank where wear and erosion due to contact with various hard substances is anticipated. The groove 12 may be formed during the manufacture of bearing blank 10 or can be machined into the finished bearing blank at any time prior to the application of the hardbanding.

The hardbanding is usually applied in multiple individual passes of a metal inert gas (MIG) welding machine. It is to be noted that although the first overlay 20 is preferably applied using a MIG welding process and is described as such herein, the first overlay can be applied to bearing blank 10 using any conventional technique such as a plasma arc welding process or the like.

Bearing blank 10 is rigged up in a rotating fixture in close proximity to the MIG welding machine. The MIG welding process is started with the gas blanketed electrode consisting of a mild steel wire forming a puddle at one end of the hard surface groove 12. The bearing substrate is rotated beneath the welding electrode and the cemented metal carbide pellets 24 are poured into the weld puddle formed by the electrode. Due to the high temperature in proximity to the electrode it is preferable that the pellets 24 be introduced into the welding puddle near the back end of the puddle near its cooling edge.

Figure 3:
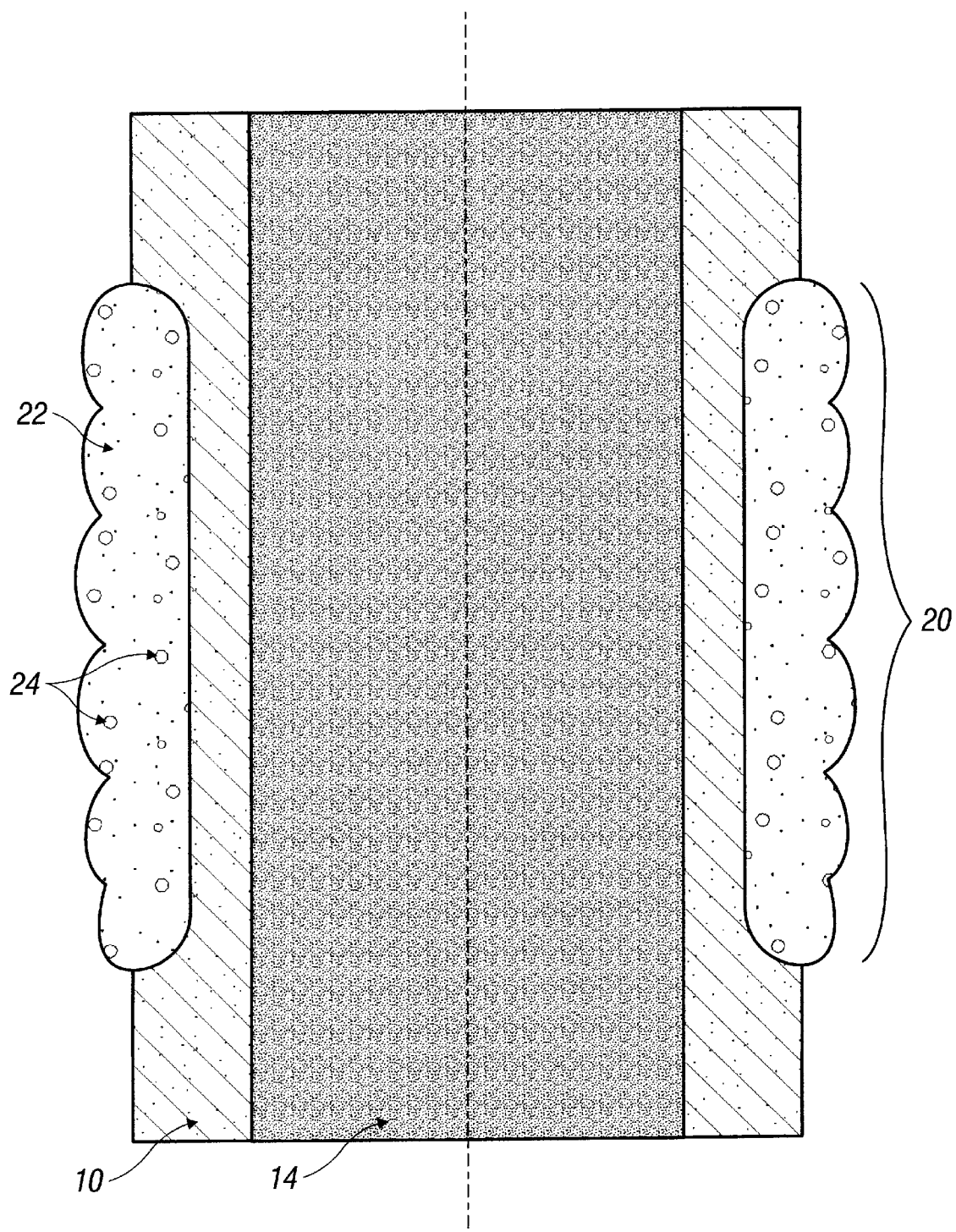
FIG. 3 is a cross sectional view of the bearing body of FIG. 2 after the application of the first overlay.

In FIG. 3, the first overlay 20 of hardbanding material is shown on bearing blank 10 within hard surface groove 12. First overlay 20 is comprised of cemented metal carbide pellets 24 in a mild steel 22.

Pellets 24 may be sintered tungsten carbide particles cemented with cobalt or other suitable metallic binder. However, other hard metal particles and binders may be used. For instance, alternative carbide pellet compositions will include cemented nickel-tungsten carbide and cemented nickel-chromium tungsten carbide. The hard metal particles in cemented metal carbide pellets 24 may range in size from large sintered tungsten carbide particles to submicron particles cemented with cobalt or other suitable metallic binders. It has been found however, that the use of submicron grain hard metal particles in pellets 24 improves the binding amongst the hard metal particles, carbon and steel in the surface of the bearing product and that this improvement in binding provides the enhancement in erosion resistance in the surface of the bearing.

The choice of which cemented metal carbide pellets should be used as pellets 24 will primarily be determined by the environment and application for which the bearing will be used. If the drilling fluids contain a high concentration of salt water, the pellets should contain nickel or nickel chromium since a cobalt binder will rapidly degrade in the presence of the salt water. Similarly, if the drilling fluids are highly acidic and/or high in carbon dioxide, it is preferable that a nickel binder be used and preferably in a lower concentration so that a higher percentage of hard metal particles can be used. Further, if the conditions in the well are highly corrosive, then a binder containing chromium is recommended.

Although the invention is not believed to be limited to a specific type of cemented metal carbide pellet in a specific binder, the remaining description of the invention assumes that the cemented metal carbide pellets are sintered tungsten carbide cemented with cobalt.

The percentage of the tungsten carbide in pellets 24 can exceed 80% and will preferably be 88% or more. The quantified percentages recited throughout this disclosure are percentages by weight. The cobalt binder in pellets 24 will account for between 6% and 20% of the pellet composition. Pellets 24 may also include minor amounts of iron, titanium, tantalum, and vanadium among other elements. However, the percentages of these other elements is relatively small and should not exceed 2% of pellet's composition. It is important to note that the hardness of the ultimate bearing surface can be adjusted by varying the concentration of hard metal particles relative to the concentration of binder in pellets 24.

The percentage of pellets 24 in overlay material 20 can range from about 40% to about 65%, while the mild steel 22 will account for between about 35% and about 60%. The size of pellets 24 may range from 8/16 down to 80/200 based on the distribution of the average particle size according to U.S. standard sieve screen measures. Preferably, the size of pellets 24 will be between about 10 to about 24 mesh.

Each pass of the electrode around the bearing substrate is approximately 3/32 of an inch thick and about 3/4 of an inch wide. It is anticipated that the width of each pass can be increased by using a MIG welding machine equipped with an oscillator. The number of passes required to cover the bearing surface will depend upon the width of that surface. After the application of the first overlay 20 is completed, the MIG welder is indexed to the starting point for the application of second overlay 28. Unlike first overlay 20, second overlay 28 must be applied using a MIG welding or similar heat process.

Figure 1:
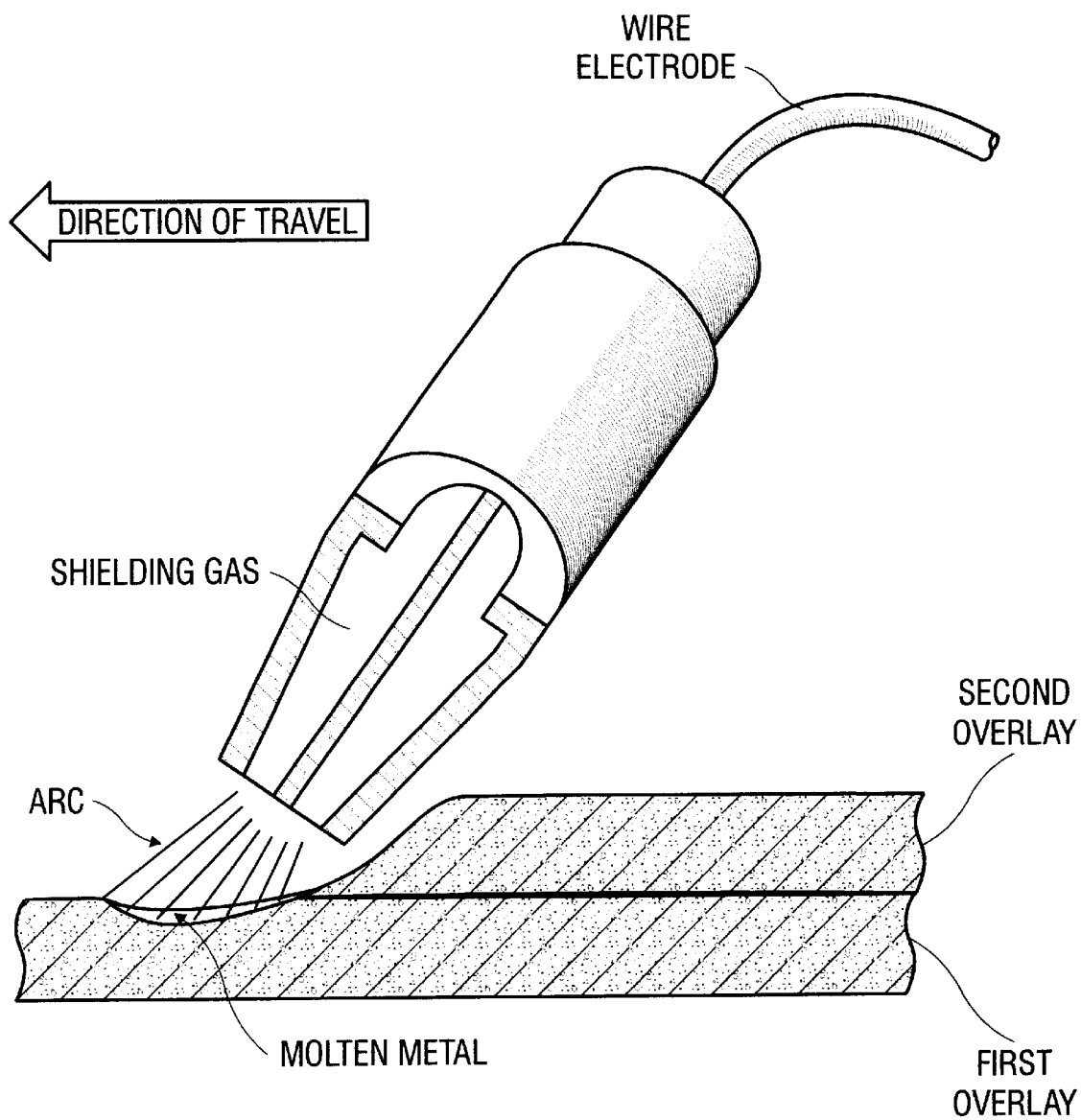
FIG. 1 is a partial cross sectional view of a metal inert gas welding step in which the first and second overlays of the present invention are shown in cross section.
Figure 4:
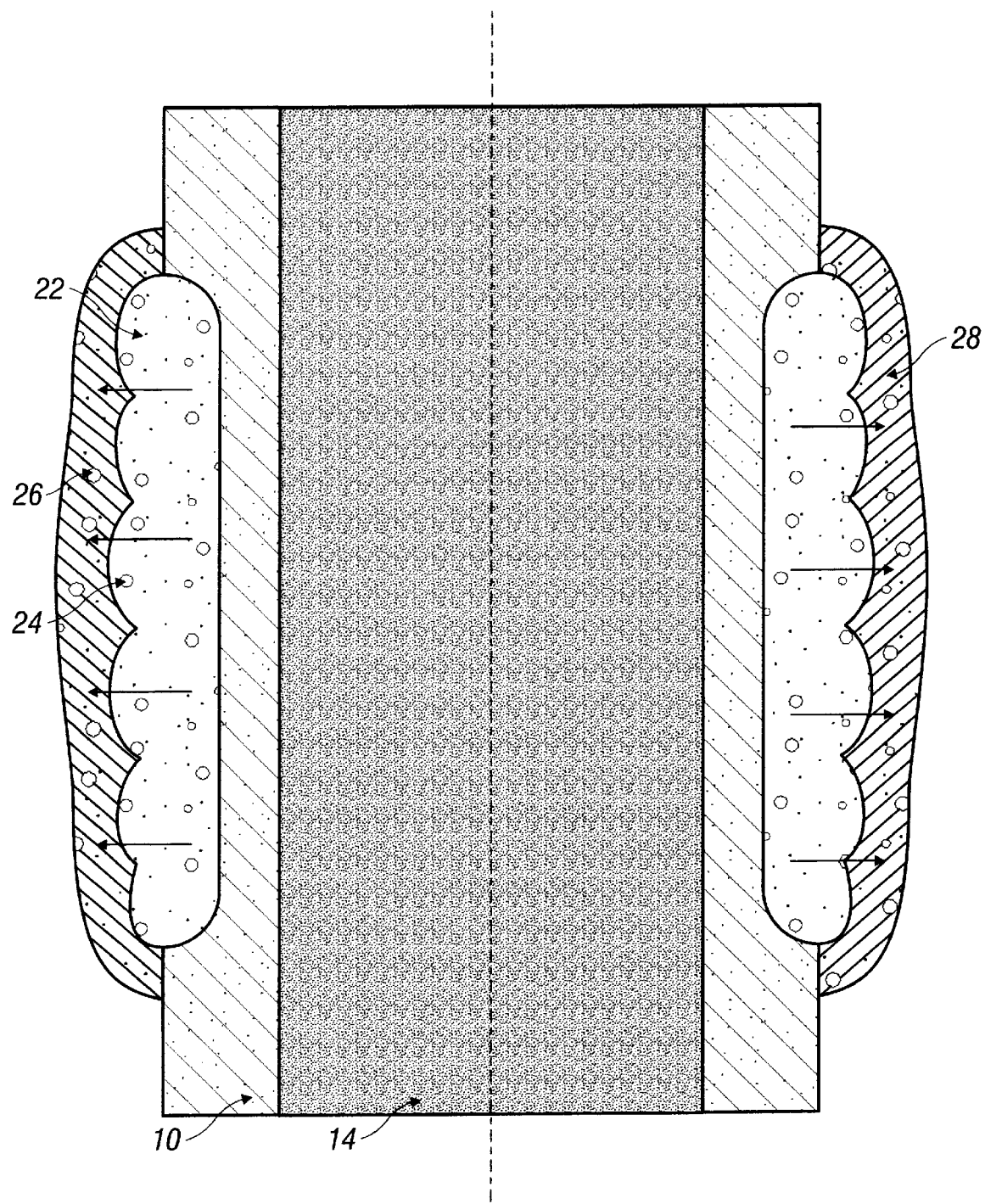
FIG. 4 is a cross sectional view of the bearing body of FIG. 3 after the application of the second overlay and illustrating the migration of the hard metal particles from the first overlay.

FIGS. 1 and 4 illustrate the bearing during manufacture, and specifically, during and following the application of second overlay 28 respectively. Second overlay 28 is composed of a mild steel and does not initially contain any cemented metal carbide pellets dispersed therein. Second overlay 28 is laid down on first overlay 20 with MIG welding as was described in connection with the application of first overlay 20.

During the application of second overlay 28 with the MIG welding process, a portion of first overlay 20 is melted and is mixed into the weld puddle of the second overlay a shown in FIG. 1. Due to differences in concentration, the hard metal particles from the first overlay 20 diffuse and disperse throughout the weld puddle and solidify in the second overlay as it cools. The MIG welding of second overlay 28 and the resulting diffusion of hard metal particles creates enhanced bonding between the materials in the second overlay as well as between the first and second overlays. In fact, there will be little or no delineation between the first and second overlays upon visual inspection.

The arrows in FIG. 4 illustrate the direction of the migration of the hard metal particles toward the external surface of the bearing and into the second overlay of mild steel. As second overlay 28 solidifies, the dispersed hard metal particles 26 alloy with the mild steel. The migration of hard particles 26 from the first to the second overlay and their bonding with the steel ultimately forms a steel hybrid matrix 30 of tungsten, carbon, and steel. Again, it is believed that the improvements in erosion resistance that have been observed in bearing surfaces treated by this process are due to the enhanced binding amongst the tungsten, carbon and steel. Further, these improvements are achieved without the application of thick layers of hard metal particles that might otherwise fail due to spalling and without creating a surface coated with hard metal particles that might otherwise abrade adjacent surfaces.

Although the hardbanding process is described through the application of first and second overlays, it is anticipated that additional overlays may be used. It is to be expected that if additional layers of cemented metal carbide pellets are used that the concentration of those pellets in each succeeding layer will be progressively reduced. It is also anticipated that regardless of the number of overlays that are utilized, the outermost overlay will be a layer of mild steel that is applied with a MIG welding or similar process.

Figure 5:
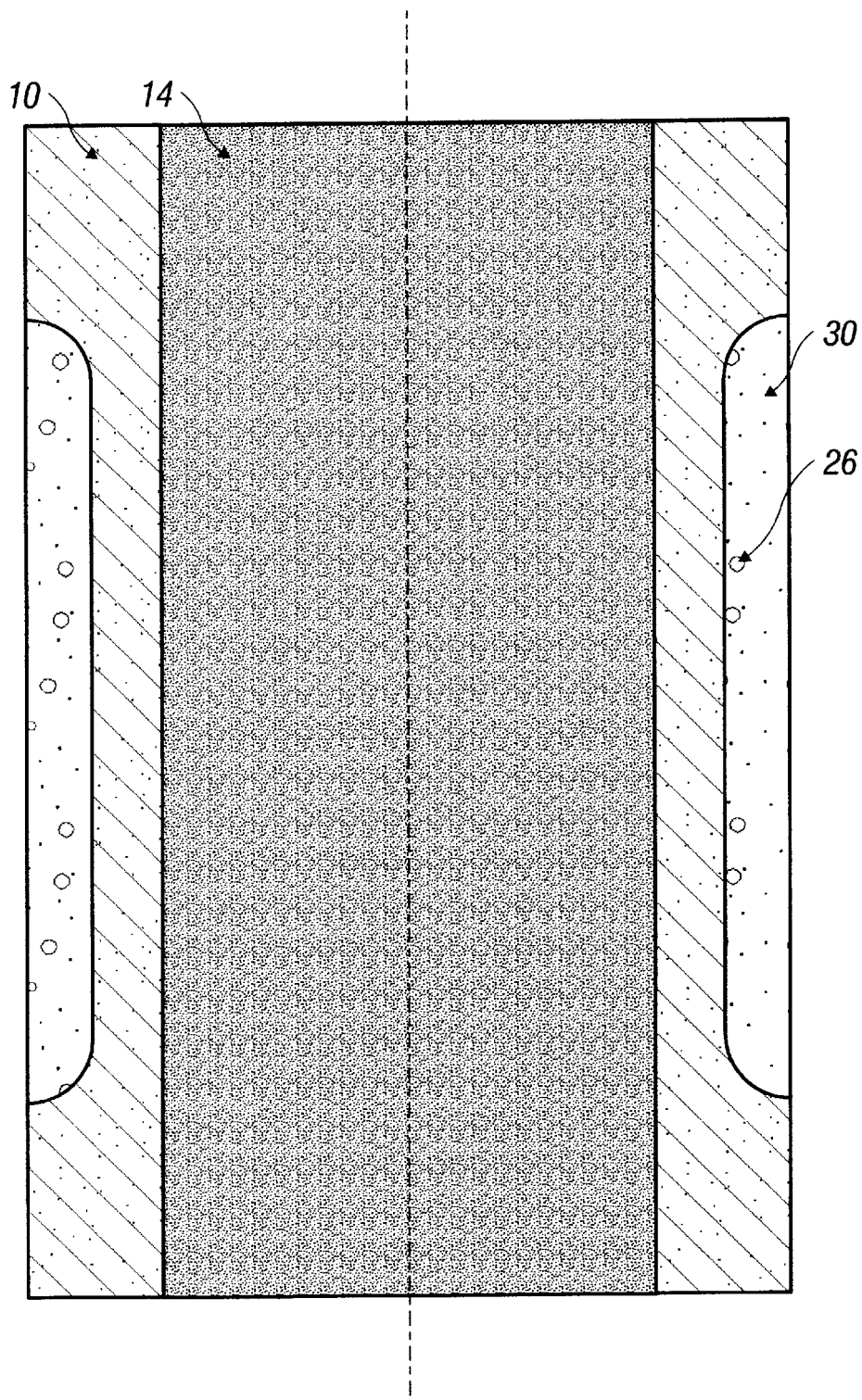
FIG. 5 is a cross sectional view of the bearing body of FIG. 4 after machining.

After the application of second overlay 28, the bearing is machined to the desired dimensions using conventional processes such as grinding and polishing. The finished bearing showing hybrid matrix 30 is illustrated in FIG. 5.

The process disclosed herein may be used to manufacture a new bearing having a wear resistant surface, or it may be used to repair worn bearings including bearings that were previously coated with hard metal particles. Regarding bearings coated with hard metal particles, the existing coatings will preferably be removed prior to applying the wear resistant coating of this invention. However, in many cases, the wear resistant coating of the present invention can be applied directly over the existing coatings, or in the alternative, a layer of mild steel can be used over the existing coating to improve the adhesion of the first overlay of the present invention.

Although the process and product of that process that have been described in terms of the manufacture of a radial bearing for a down hole motor, it is to be noted that the improvements in wear and erosion resistance achieved through this process may be applied to many different types of metal parts. For instance, the process would apply equally well to radial bearings that are not used in down hole applications, such as in hydraulic systems and turbines. Further, the thrust bearings and the rotor of a down hole hydraulic motor would likewise benefit from the improvements in wear resistance that can be attained through the disclosed process. Furthermore, turbine drive shafts, valves, valve parts, blades, couplings, rotor wheels and rims, rings and other rotating metal parts that are subjected to erosive environments would likewise benefit from this disclosure.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A method of making a steel bearing member having an erosion resistant surface, comprising the steps of:

applying a first overlay of hardbanding material to a bearing substrate, the first overlay having sintered cemented metal carbide pellets dispersed in steel, the cemented metal carbide pellets containing hard submicron sized particles; and applying to the first overlay a second overlay of steel using a heat process whereby a portion of the hard submicron sized particles migrates into a significant portion of the second overlay and forms with the first overlay, a steel hybrid matrix of tungsten, carbon and steel.

2. The method of claim 1 that includes machining a surface of the second overlay.

3. The method of claim 1, wherein the bearing substrate is a cylindrical member.

4. The method of claim 1, wherein the hard particles of the cemented metal carbide pellets are chosen from the group of cobalt carbide, tungsten carbide, nickel carbide, chromium carbide and mixtures thereof.

5. The method of claim 2 that includes machining the surface of the second overlay so as to substantially remove steel not formed into the steel hybrid matrix of tungsten carbon and steel.

6. The method of claim 1 wherein applying the second overlay includes welding.

7. The method of claim 1 wherein the applying the first overlay includes welding.

8. The method of claims 6 or 7 wherein the welding includes metal inert gas welding or plasma arc welding.

9. The method of claim 2 wherein the machining includes grinding.

10. The method of claim 1 wherein the heat process provides substantially no visual delineation between the first and second overlays.

11. The method of claim 2 wherein the first and second overlays have a thickness in combination of less than 3/16 of an inch after machining.

12. The method of claim 1 wherein the applying the first overlay includes thermal spraying.

13. The method of claim 1 wherein the sintered cemented metal carbide pellets comprise at least 80 weight percent tungsten carbide.

14. The method of claim 1 further comprising applying a third overlay of hardbanding material to the second overlay.

15. The method of claims 2, 5 or 9 further comprising applying a third overlay of hardbanding material after machining or grinding the surface.

* * * * *

UNITED STATES PATENT AND TRADEMARK OFFICE
CERTIFICATE OF CORRECTION

PATENT NO. : 6,117,493
DATED : September 12, 2000
INVENTOR(S) : Robert B. North

It is certified that error appears in the above-identified patent and that said Letters Patent is hereby corrected as shown below:

On Col. 8, line 21 delete "significant".

On Col. 8, line 35, after "tungsten" and before "carbide", insert --,--.

On Col. 1, line 60, delete "a" and insert --as--.

On Col. 4, line 49, delete "including" and insert --includes--.

On Col. 6, line 58, delete "a" and insert --as--.

Signed and Sealed this

Twenty-fourth Day of April, 2001

Attest:

NICHOLAS P. GODICI

*Attesting Officer*     *Acting Director of the United States Patent and Trademark Office*